US010745017B2

(12) United States Patent
Wright et al.

(10) Patent No.: US 10,745,017 B2
(45) Date of Patent: Aug. 18, 2020

(54) METHOD AND VEHICLE UTILIZING PREDICTIVE ROAD CURVATURE IN THE TRANSMISSION CONTROL MODULE

(71) Applicant: GM Global Technology Operations LLC, Detroit, MI (US)

(72) Inventors: Henry R. Wright, Huntington Woods, MI (US); Rakesh Mohanty, Milford, MI (US); Crystal J. Nassouri, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 267 days.

(21) Appl. No.: 16/002,316

(22) Filed: Jun. 7, 2018

(65) Prior Publication Data

US 2019/0375414 A1 Dec. 12, 2019

(51) Int. Cl.
*B60W 40/072* (2012.01)
*B60W 10/10* (2012.01)
*B60W 10/18* (2012.01)

(52) U.S. Cl.
CPC .......... *B60W 40/072* (2013.01); *B60W 10/10* (2013.01); *B60W 10/18* (2013.01); *B60W 2420/403* (2013.01); *B60W 2552/30* (2020.02); *B60W 2710/105* (2013.01); *B60W 2710/1038* (2013.01); *B60W 2710/18* (2013.01)

(58) Field of Classification Search
CPC .... B60W 40/072; B60W 10/10; B60W 10/18; B60W 2552/30; B60W 2420/403; B60W 2710/1038; B60W 2710/105; B60W 2710/18
See application file for complete search history.

(56) References Cited

U.S. PATENT DOCUMENTS

| 6,138,084 | A | 10/2000 | Mine | |
|---|---|---|---|---|
| 6,304,818 | B1 | 10/2001 | Kamiya | |
| 7,184,073 | B2 | 2/2007 | Varadarajan et al. | |
| 9,926,011 | B2 * | 3/2018 | Harda | B62D 15/025 |
| 10,358,057 | B2 * | 7/2019 | Breed | G05D 1/0246 |
| 10,445,954 | B2 * | 10/2019 | Tamari | G06F 11/3013 |
| 10,525,973 | B2 * | 1/2020 | Mizoguchi | B60W 40/072 |
| 2013/0006473 | A1 * | 1/2013 | Buerkle | B62D 1/28 |
| | | | | 701/41 |

* cited by examiner

Primary Examiner — Tinh Dang
(74) Attorney, Agent, or Firm — Quinn IP Law

(57) ABSTRACT

A method for controlling a transmission of a vehicle includes: determining, via an electronic controller, a predicted lateral G-force that will act on the vehicle while the vehicle moves along a road curve using image data from a front camera of the vehicle before the vehicle moves along the road curve; communicating, via the electronic controller, the predicted lateral G-force to a transmission controller; and and controlling, via the transmission controller, the transmission of the vehicle based on the predicted lateral G-force.

20 Claims, 5 Drawing Sheets

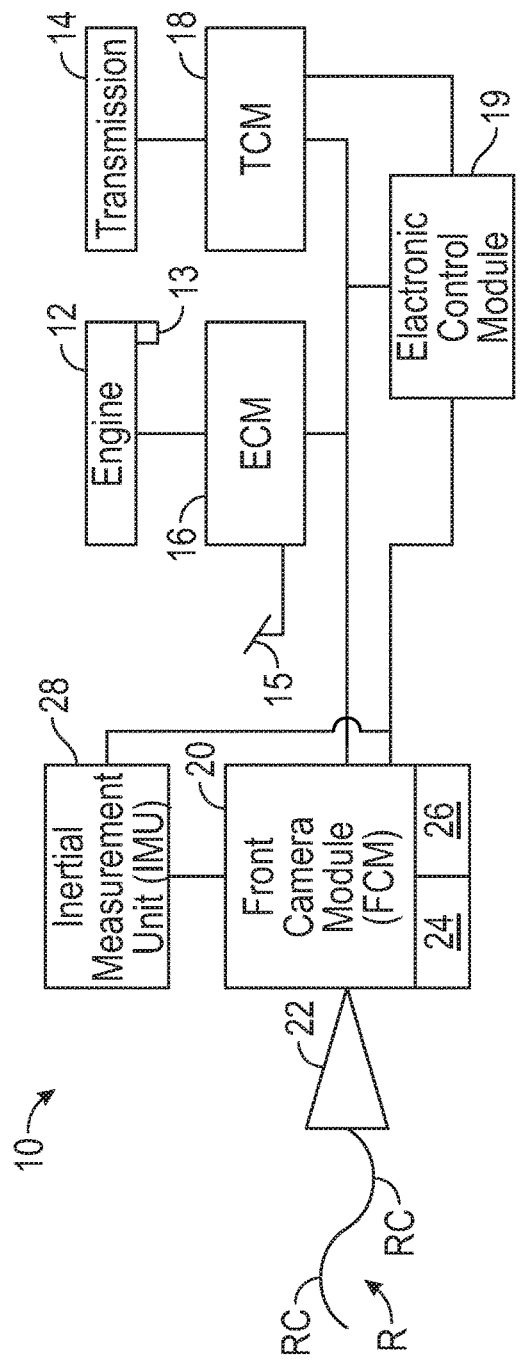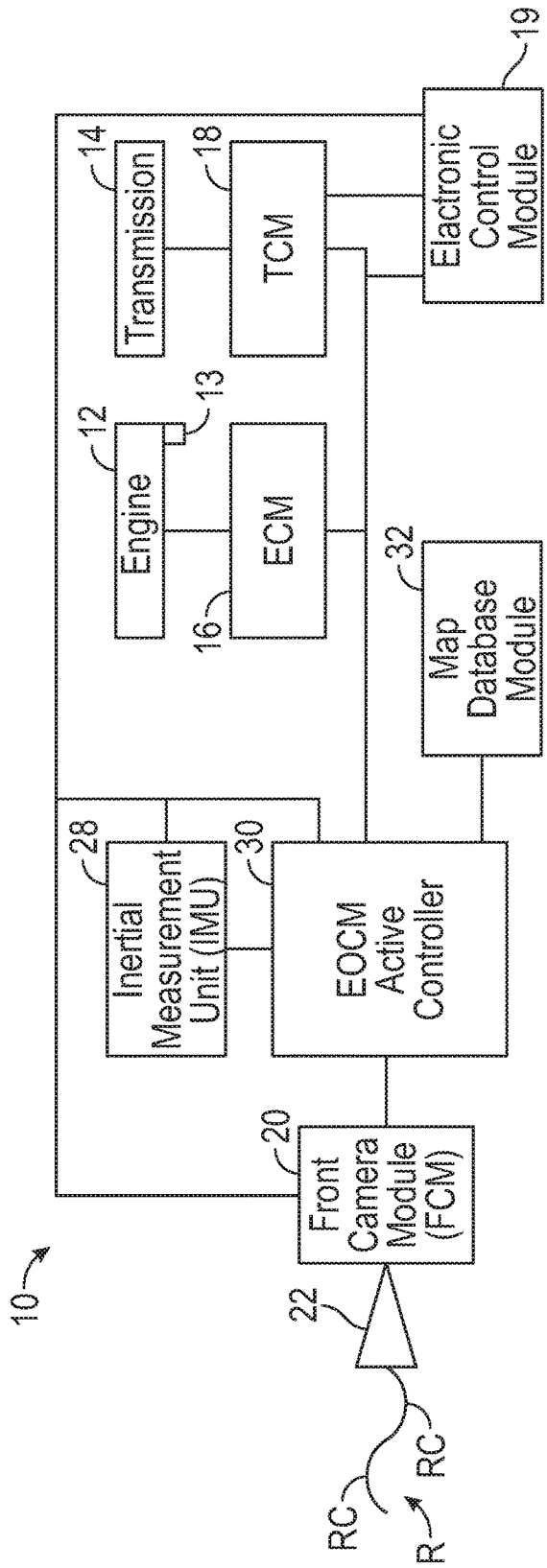

METHOD AND VEHICLE UTILIZING PREDICTIVE ROAD CURVATURE IN THE TRANSMISSION CONTROL MODULE

INTRODUCTION

The present disclosure relates to a method and vehicle that utilizes predictive road curvature in the transmission control module.

Some vehicles include an internal combustion engine and transmission for providing speed and torque conversion from the internal combustion engine to the wheels.

SUMMARY

It is desirable to predict road conditions ahead of time to optimize the performance of the transmission. For this purpose, the present disclosure describes a method for controlling the transmission of the vehicle using a predicted curvature of the road. Lateral G-forces may be determined from a sensor, such as an inertial measuring unit (IMU). However, the lateral G-forces measured by the sensor represent delayed information of the driver's intent. In order to optimize a sports-shifting feature of the vehicle (i.e., to optimize the performance of the transmission), it is desirable to predict the road conditions ahead of time. Using the front camera module (FCM) and/or map data (stored on the map database module) if equipped, an electronic control module determines predicted lateral G-forces within a driving style detection algorithm in the TCM. Then, a transmission control module selects a speed ratio for the transmission based on the predicted lateral G-force. The electronic control module may be referred to as an electronic controller.

In certain embodiments, the methods for controlling the transmission of the vehicle includes: determining, via an electronic control module of the vehicle, a predicted lateral G-force that will act on the vehicle while the vehicle moves along a road curve using image data from a front camera of the vehicle before the vehicle moves along the road curve; communicating, via the electronic controller, the predicted lateral G-force to a transmission controller; and controlling, via the transmission controller of the vehicle, the transmission of the vehicle based on the predicted lateral G-force. The method may further include determining, via the electronic controller, the predicted lateral G-force which includes: determining an amount of time the vehicle will take to reach the road curve from a current location as a function of a current vehicle speed of the vehicle and a predicted distance from the current location of the vehicle to the road curve; and determining a predicted vehicle speed of the vehicle at the road curve as a function of the current vehicle speed and an acceleration of the vehicle. The predicted lateral G-force is a function of a road curvature and the predicted vehicle speed at the road curve.

The method may further include equating the predicted lateral G-force with a current, actual lateral G-force measured by an inertial measuring unit of the vehicle in response to determining that the predicted lateral G-force is greater than the current, actual lateral G-force. The method may further include taking an absolute value of the predicted lateral G-force and filtering the absolute value of the predicted lateral G-force to determine a final lateral G-force value. The method may further include enabling a predetermined transmission operating level in response to determining that the final lateral G-force value is greater than an enable threshold. The method may further include disabling the predetermined transmission operating level in response to determining that the final lateral G-force is less than the disable threshold. The method may further include selecting a speed ratio of the transmission based on the predetermined transmission operating level. The predictive lateral G-force is determined based on the image data from the front camera and map data stored on a map database module of the vehicle.

The present disclosure also relates to a vehicle system. The vehicle system includes a transmission and a front camera module including a camera processor, a camera in electronic communication with the camera processor, and a front camera in electronic communication with the camera processor. The camera processor is programmed to determine a road curvature of a road curve using image data from the front camera before the vehicle moves along the road curve. The vehicle system further includes an electronic control module and a transmission control module in electronic communication with the front camera module and the electronic control module. The electronic control module is programmed to: receive image data from the front camera of the vehicle system before the vehicle system moves along the road curve; determine an amount of time the vehicle will take to reach the road curve from a current location as a function of a current vehicle speed of the vehicle system and a predicted distance from the current location of the vehicle system to the road curve; determine a predicted vehicle speed of the vehicle system at the road curve as a function of the current vehicle speed and a current vehicle acceleration of the vehicle system; and determine a predicted lateral G-force that will act on the vehicle system while the vehicle system moves along the road curve using the road curvature of the road curve. The electronic control module communicates the predicted lateral G-force to the transmission controller. The transmission controller is programmed to: (a) receive the predicted lateral G-force from the electronic control module, and (b) control an operation of the transmission based on the predicted lateral G-force.

The predicted lateral G-force may be expressed as:

$$PLG = k \cdot V_p^2$$

where:
PLG is the predicted lateral G-force that will act on the vehicle system while the vehicle moves along the road curve of the road;
k is the road curvature of the road curve; and
$V_p$ is the predicted vehicle speed of the vehicle system at the road curve.

The vehicle system further includes an inertial measurement unit in electronic communication with the front camera module and the transmission control module. The inertial measurement unit is configured to measure a current, actual lateral G-force acting on the vehicle. The electronic control module is programmed to determine that the predicted lateral G-force is greater than the current, actual lateral G-force. The electronic control module is programmed to equate the predicted lateral G-force with the current, actual lateral G-force measured by the inertial measuring unit of the vehicle system in response to determining that the predicted lateral G-force is greater than the current, actual lateral G-force. The vehicle system further includes an active controller in electronic communication with the front camera module and the electronic control module. The vehicle system further includes a map database module in electronic communication with the active controller, wherein the transmission control module is in electronic communication with the active controller, and the predictive lateral G-force is determined based on the image data from the front camera and map data stored on the map database module of the vehicle system.

The electronic control module is programmed to divide the current vehicle speed of the vehicle system by the predicted distance from the current location to the road curve to determine the amount of time the vehicle will take to reach the road curve from the current location. The electronic control module is programmed to take an absolute value of the predicted lateral G-force and filtering the absolute value of the predicted lateral G-force to determine a final lateral G-force value. The transmission control module is programmed to enable a predetermined transmission operating level in response to determining (by the electric control module) that the final lateral G-force value is greater than an enable threshold, and the transmission control module is programmed select a speed ratio of the transmission based on the predetermined transmission operating level, and the predicted vehicle speed at the road curve is expressed as:

$$V_p = V_c + A \cdot T$$

where:
$V_p$ is the predicted vehicle speed of the vehicle system at the road curve;
A is the current vehicle acceleration of the vehicle system;
T is the amount of time the vehicle will take to reach the road curve from the current location of the vehicle system; and
$V_c$ is the current vehicle speed.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic illustration of a vehicle including a front camera module;

FIG. 2 is a schematic illustration of a vehicle including a front camera module and a map database module;

DETAILED DESCRIPTION

Figure 3:
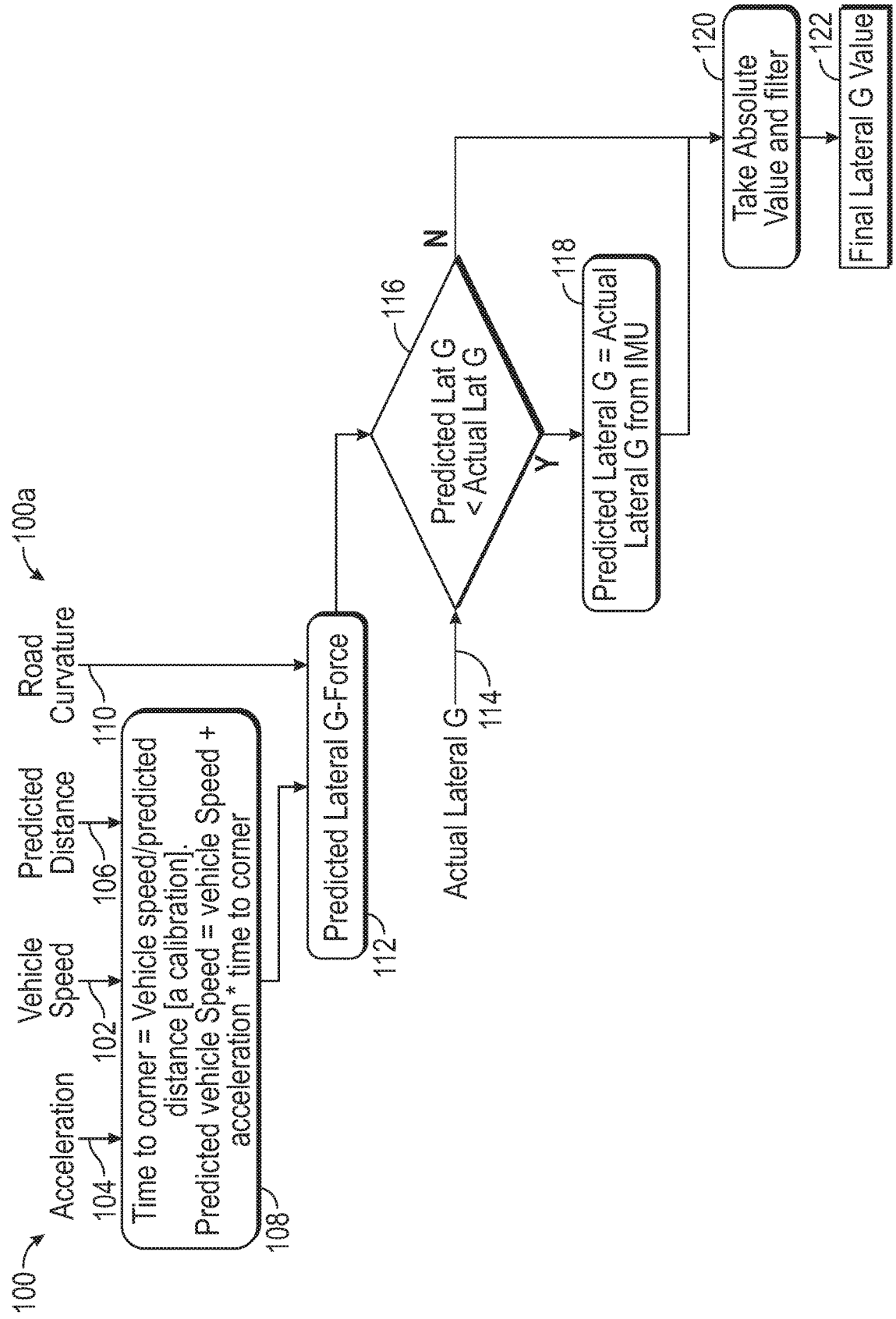
FIG. 3 is a flowchart illustrating part of a method for controlling a transmission of the vehicles shown in FIGS. 1 and 2.
Figure 4:
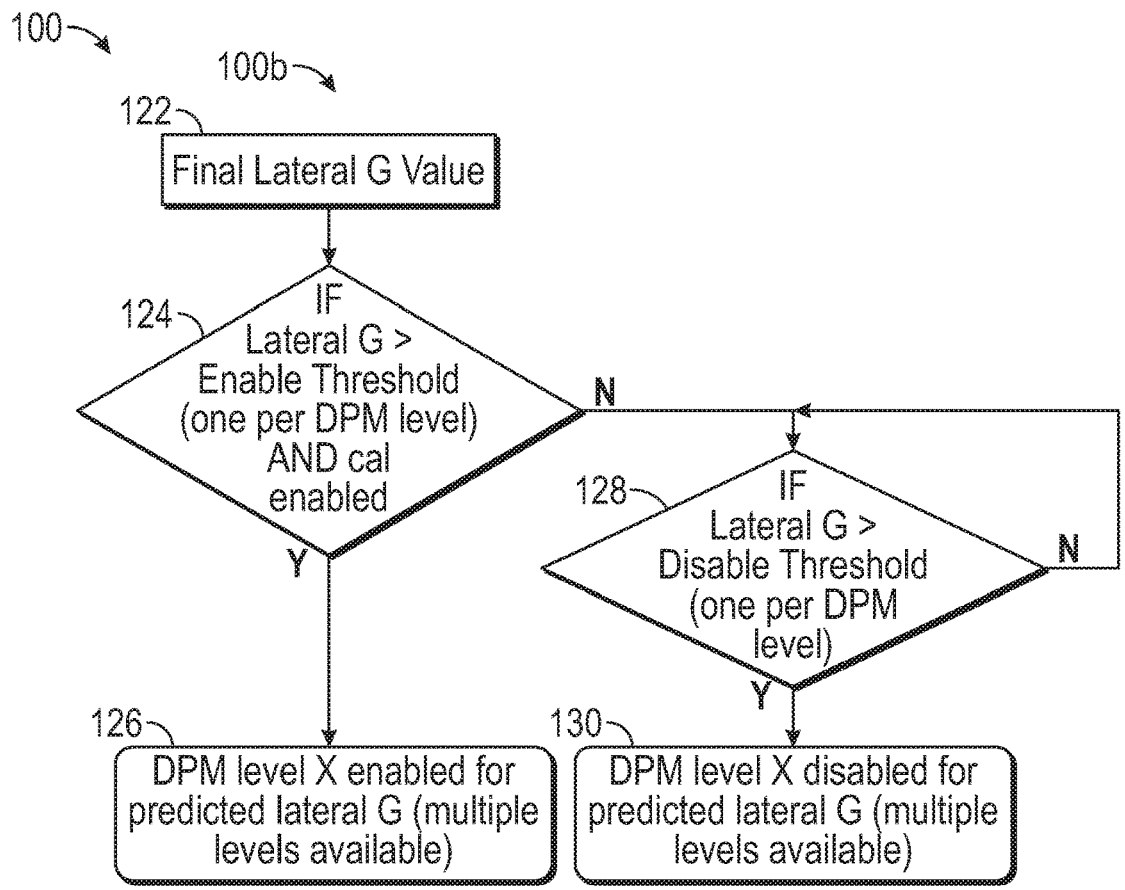
FIG. 4 is a flowchart illustrating another part of a method for controlling a transmission of the vehicles shown in FIGS. 1 and 2.
Figure 5:
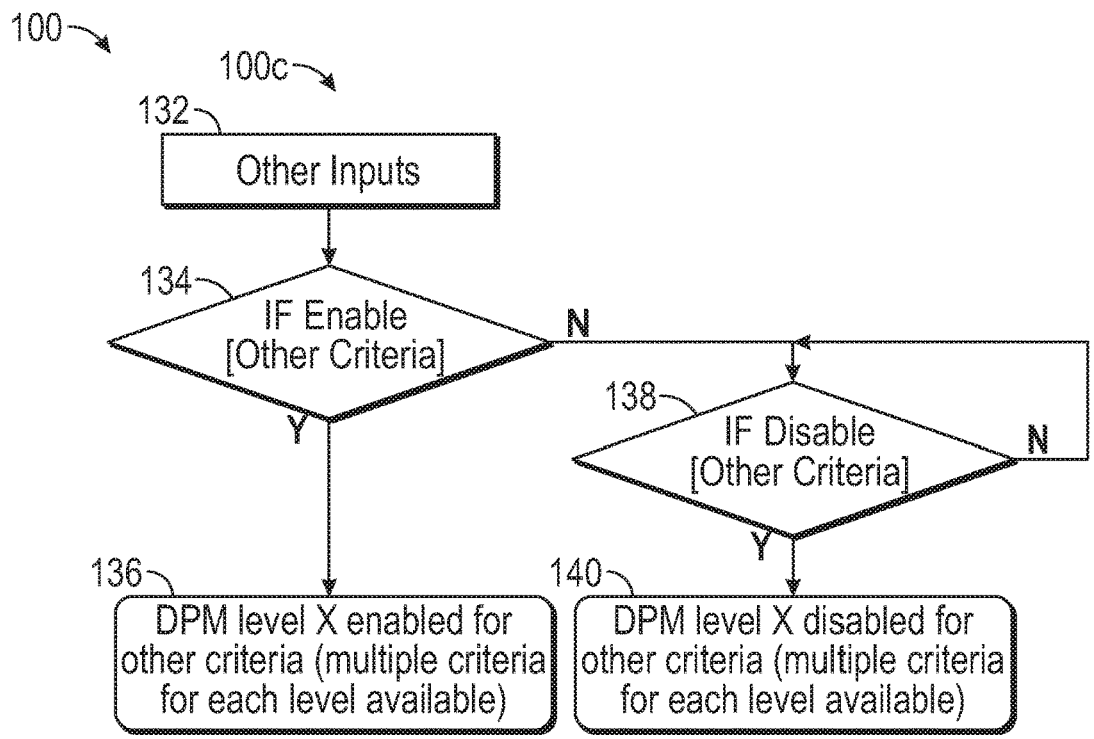
FIG. 5 is a flowchart illustrating yet another part of a method for controlling a transmission of the vehicles shown in FIGS. 1 and 2.
Figure 6:
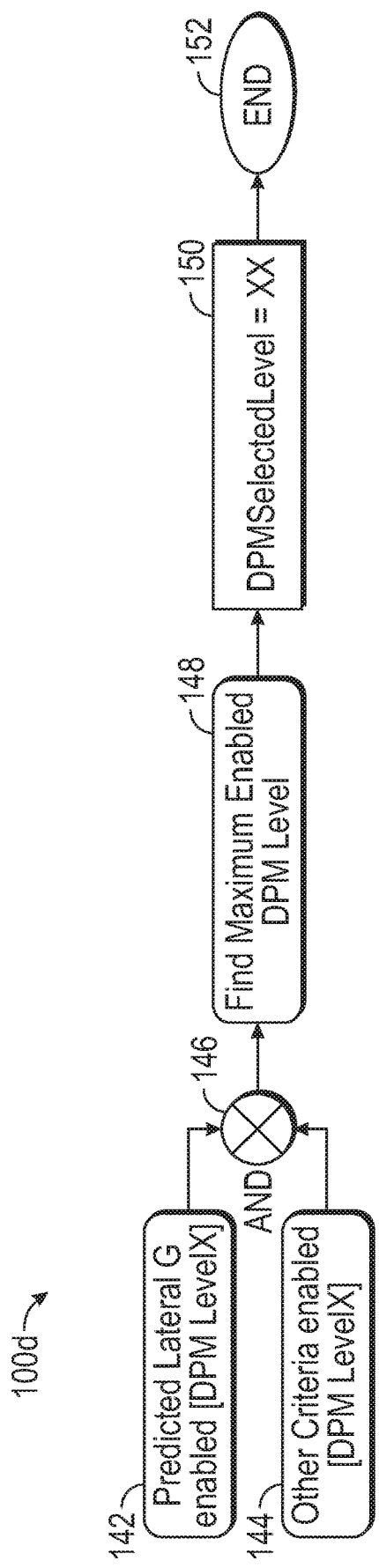
FIG. 6 is a flowchart illustrating yet another part of a method for controlling a transmission of the vehicles shown in FIGS. 1 and 2.

With reference to FIG. 1, a vehicle system 10 includes an internal combustion engine 12, such as a gasoline engine or a diesel engine. The internal combustion engine 12 is configured to generate power to propel the vehicle. The vehicle system 10 further includes a transmission 14 (e.g., an automatic transmission) for speed and torque conversion between the internal combustion engine 12 and the vehicle wheels. The transmission 14 is mechanically coupled to the internal combustion engine 12 and may be, for example, a gear transmission or continuous variable transmission (CVT). Regardless, the transmission 14 is configured to change between speed ratios. The vehicle system 10 may be simply referred to as a vehicle and may be, for example, a truck or a car.

The vehicle system 10 further includes an engine control module (ECM) 16 in electronic communication with the internal combustion engine 12. The ECM 16 may alternatively be referred to as the engine controller and is programmed to control the operation of the internal combustion engine 12. The vehicle system 10 further includes a transmission control module (TCM) 18 in electronic communication with the transmission 14. The TCM 18 may alternatively be referred to as the transmission controller and is programmed to control the operation of the transmission 14. The vehicle system 10 further includes an electronic control module 19 in electronic communication with the transmission control module 18. The electronic control module 19 may be referred to as the electronic controller.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean a controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or other suitable communications link. Communications includes exchanging data signals in a suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' and related terms describe steps or processes that are executed in real-time and are characterized by monitoring or otherwise determining states of parameters and regularly or periodically updating the states of the parameters during execution of a routine or between iterations of execution of the routine.

The vehicle system 10 further includes a front camera module (FCM) 20 in electronic communication with the ECM 16, the TCM 18, and the electronic control module 19. The front camera module 20 includes a camera 22 configured to capture images of a road R ahead of the vehicle system 10. Thus, the camera 22 points to the front of the vehicle system 10 to capture images in a direction forward of the vehicle system 10. The road R includes one or more road curves RC each having a road curvature. The front camera module 20 further includes a camera processor 24 and a camera memory 26 in electronic communication with the camera processor 24. The camera memory 26 is a non-transitory storage medium capable of storing image data received from the camera 22. The camera 22 is in electronic communication with the camera processor 24 and is configured to process the image data received from the camera 22. The camera 22 is therefore configured to capture images of the road R and generate image data based on the captured images. The FCM 20 allows the vehicle system 10 to employ a lane keep assistance (LKA) system.

The vehicle system 10 further includes an inertial measurement unit (IMU) 28 having, among other things, accelerometers, gyroscopes, and/or magnetometers and is configured to measure, among other things, a lateral G-force, a longitudinal G-force, a banking angle, and a grade detection of the vehicle. In the present disclosure, the term "G-force" means a type of acceleration that causes the accelerating object to experience a force acting in the opposite direction to the acceleration. The IMU 28 is in electronic communication with the FCM 20, the ECM 16, the TCM 18, and the electronic control module 19.

With reference to FIG. 2, the vehicle system 10 may additionally include an external object calculation module (EOCM) 30 for detecting objects external to the vehicle system 10. The EOCM 30 may alternatively referred to as the active controller. The EOCM 30 is in electronic communication with the FCM 20 and the IMU 28. The vehicle system 10 further includes a map database module 32 in electronic communication with the EOCM 30. The map database module 32 includes a database with information about the road R, such as high-resolution road curvature data, road bank angle data. The map database module 32 is synchronized with the GPS system of the vehicle system 10.

FIGS. 3-6 disclose parts 100a, 100b, 100c, and 100d (e.g., routines) of a method 100 for controlling the transmission 14 of the vehicle system 10 using a predicted road curvature of the road R. Lateral G-forces may be determined from a sensor, such as the IMU 28. However, the lateral G-forces measured by the sensor represent delayed information of the driver's intent. In order to optimize a sports-shifting feature of the vehicle system 10 (i.e., to optimize the performance of the transmission 14), it is desirable to predict the road conditions ahead of time. Using the FCM 20 and/or map data (stored on the map database module 32) if equipped, the electronic control module 19 determines (i.e., estimates) the predicted lateral G-forces within a driving style detection algorithm in the TCM 18. The presently disclosed method 100 does not directly control the speed ratio of the transmission 14. Rather, the presently disclosed method 100 raises awareness in a Dynamic Performance Mode (DPM) algorithm in the TCM 18 to augment existing signals which will then choose the appropriate speed ratio. The DPM is a sports-shifting function in the TCM 18 with varying levels of sensitivity to driving style.

With reference to FIG. 3, a first part 100a of the method 100 begins at step 102, which entails determining the current vehicle speed of the vehicle system 10. The current vehicle speed of the vehicle system 10 may be determined using a speed sensor 13 (FIG. 1) operatively coupled to the internal combustion engine 12. The speed sensor 13 is configured to measure and monitor the current vehicle speed of the vehicle system 10. The speed sensor 13 is in electronic communication with the TCM 18 (through, for example, the ECM 16) and the electronic control module 19. The first part 100a of the method 100 also includes step 104. At step 104, the electronic control module 19 determines the current vehicle acceleration of the vehicle system 10, which may be obtained from the ECM 16. The ECM 16 may, for example, determine the current vehicle acceleration of the vehicle system 10 based on a position of an acceleration pedal 15 of the vehicle system 10. The accelerator pedal 15 is in electronic communication with the ECM 16. The first part 100a of the method 100 also includes determining the predicted distance from the current location of the vehicle system 10 to the road curvature detected by the FCM 20. This predicted distance may be obtained from a calibrated look-up table based on the image data received from the FCM 20 and/or the map data received from the map database module 32. Additionally or alternatively, at step 106, the FCM 20 may include a LIDAR sensor to determine the predicted distance from the current position of the vehicle system 10 to the road curvature of the road curve RC. After determining the predicted distance 106 from the current location of the vehicle system 10 to the road curvature detected by the FCM 20, the vehicle speed, and the current vehicle acceleration of the vehicle system 10, the method 100 proceeds to step 108.

At step 108, the electronic control module 19 determines the amount of time the vehicle system 10 will take to reach the road curve RC detected by the FCM 20 from the current location of the vehicle system 10 as a function of the current vehicle speed of the vehicle system 10 and the predicted distance from the current location of the vehicle system 10 to the road curve RC. To determine the amount of time the vehicle system 10 will take to reach the road curve RC detected by the FCM 20 from the current location of the vehicle system 10, the electronic control module 19 divides the current vehicle speed by the predicted distance. At step 108, the electronic control module 19 also determines the predicted vehicle speed of the vehicle system 10 at the road curve RC as a function of the current vehicle speed and the current vehicle acceleration of the vehicle system 10. To do so, the electronic control module 19 calculates the predicted vehicle speed at the road curve RC as follows:

$$V_p = V_c + A \cdot T$$

where:

$V_p$ is the predicted vehicle speed of the vehicle system 10 at the road curve RC;

A is the current vehicle acceleration;

T is the amount of time the vehicle system 10 will take to reach the road curve RC from its current location of the vehicle system 10; and $V_c$ is the current vehicle speed.

After determining the predicted vehicle speed of the vehicle system 10 at the road curve RC and the amount of time the vehicle system 10 will take to reach the road curve RC from its current location of the vehicle system 10, the method 100 proceeds to step 110. At step 110, the electronic control module 19 determines the road curvature of the RC as determined by the FCM 20.

At step 110, the ECM 19 determines the road curvature of the road curve RC based on image data received from the FCM 20. As discussed above, the FCM 20 is in electronic communication with the electronic control module 19. Accordingly, the FCM 20 is configured to transmit image data to the ECM 19. The curvature of a road curve may be defined as the reciprocal of the radius of the road curve. To determine the road curvature of the road curve RC, the FCM 20 may employ the following equations:

$$y(x)=c0+c1 \cdot x+c2 \cdot x^2+c3 \cdot x^3 \ldots +cn \cdot x^n$$

where:
y is the position of the vehicle at x distance in global frame of reference; and
x is the distance from a center of the global frame of reference to the position of the vehicle; and
c0, c1, c2, and c3 are coefficients determined by the FCM 20 based on the image data;

$$\kappa = \frac{|y''|}{(1+y'^2)^{\frac{3}{2}}}$$

κ is the curvature (in absolute value) of the road curve RC;
y' is the first derivative of the position of the vehicle at x distance in global frame of reference; and
y'' is the second derivative of the position of the vehicle at x distance in global frame of reference.

$$k = \frac{y''}{(1+y'^2)^{\frac{3}{2}}}$$

k is the signed curvature of the road curve RC;
y' is the first derivative of the position of the vehicle at x distance in global frame of reference; and
y'' is the second derivative of the position of the vehicle at x distance in global frame of reference.

After determining the road curvature of the road curve RC, then the method 100 proceeds to step 112. At step 112, the electronic control module 19 determines the predicted lateral G-force that will act on the vehicle system 10 while the vehicle system 10 moves along the road curve RC of the road R using the image data from FCM 20 of the vehicle system 10 before the vehicle system 10 moves along the road curve RC. To do so, the electronic control module 19 calculates the predicted lateral G-force using the following equation:

$$PLG=k \cdot V_p^2$$

where:
PLG is the predicted lateral G-force that will act on the vehicle system 10 while the vehicle system 10 moves along the road curve RC of the road R;
k is the road curvature of the road curve RC; and
$V_p$ is the predicted vehicle speed of the vehicle system 10 at the road curve RC.

Therefore, the predicted lateral G-force is a function of the road curvature of the road curve RC and the predicted vehicle speed $V_p$ of the vehicle system 10 at the road curve RC. The electronic control module 19 may also take into account the bank angle of the road R to determine the predicted lateral G-force. The bank angle of the road R provides some acceleration component and is also provided by the map database module 32. The bank angle of the road R serves to modify a target limit of the predicted lateral G-force and not necessarily how the curvature is calculated. Thus, the electronic control module 19 may calculate the predicted lateral G-force using the following equations:

$$k \cdot V_p^2 = a \rightarrow k \cdot V_p^2 = a\_bank + a\_curvature;$$

PLG=lateral contribution from curvature+lateral contribution due to bank angle where:
PLG is the predicted lateral G-force that will act on the vehicle system 10 while the vehicle system 10 moves along the road curve RC of the road R;
k is the road curvature of the road curve RC; and
$V_p$ is the predicted vehicle speed of the vehicle system 10 at the road curve RC;
a_bank is the lateral g-force contribution from the bank angle; and
a_curvature is the lateral g-force contribution from the road curvature.

After determining the predicted lateral G-force, the method 100 continues to step 114. At step 114, the electronic control module 19 determines the current, actual lateral G-force measured by the IMU 28. The term "current, actual lateral G-force" means the lateral G-force measured by the IMU 28 at a present moment before the vehicle system 10 moves along the road curve RC of the road R. The electronic control module 19 receives the current, actual lateral G-force from the IMU 28, because the IMU 28 is in electronic communication with the TCM 18. Stated differently, the electronic control module 19 is programmed to determine the current, actual lateral G-force based on a signal received from the IMU 28. Then, the method 100 proceeds to step 116.

At step 116, the electronic control module 19 compares the current, actual lateral G-force (i.e., the Actual LatG) to the predicted lateral G-force (i.e., the Predicted LatG) to determine whether the predicted lateral G-force is less than the current, actual lateral G-force. If and solely if the predicted lateral G-force is less than the current, actual lateral G-force, then the method 100 proceeds to step 118. If and solely if the predicted lateral G-force is not less than the current, actual lateral G-force, then the method 100 proceeds directly to step 120.

At step 118, the electronic control module 19 equates the predicted lateral G-force with a current, actual lateral G-force measured by the IMU 28 inertial measuring unit of the vehicle system 10 in response to determining that the predicted lateral G-force is less than the current, actual lateral G-force. After step 118, the method 100 proceeds to step 120.

At step 120, the electronic control module 19 takes the absolute value of (and filters) the predicted lateral G-force determine a final lateral G-force value. To take the absolute value, the electronic control module 19 determines the non-negative value of the predicted lateral G-force without regard to its sign. To filter the predicted lateral G-force, the electronic control module 19 eliminates value above an upper threshold and below a lower threshold. Thereafter, the method 100 proceeds to step 122, in which the electronic control module 19 stores the final lateral G-force value. Also at step 122, the electronic control module 19 communicates the final lateral G-force value to the TCM 18. Stated differently, at step 122, the TCM 18 receives the final lateral G-force value from the electronic control module 19.

After determining and storing the final lateral G-force value at step 122, the second part 100b of the method 100 begins. At step 124, the TCM 18 determines the if the final lateral G-force value is greater than an enable threshold for each DPM level and a calibrated enabled value. As mentioned above, the DPM is a sports-shifting function in the TCM 18 with varying levels of sensitivity to driving style. If final lateral G-force value is greater than an enable threshold for each DPM level and a calibrated enabled value, then the method 100 proceeds to step 126.

At step 126, the TCM 18 enables a predetermined transmission operating level in response to determining that the final lateral G-force value is greater than the enable threshold (one per DPM level) and the calibrated enabled value. As discussed, the TCM 18 operates in multiple DPM levels. Each DPM level controls the transmission operation, such as gear holds and force downshifts. Thus, the TCM 18 enables the predetermined transmission operating level for the final lateral G-force value in response to determining that the final lateral G-force value is greater than the enable threshold and the calibrated enabled value.

If final lateral G-force value is not greater than the enable threshold for each DPM level and the calibrated enabled value, then the method 100 proceeds to step 128. At step 128, the TCM 18 determines whether the final lateral G-force value is less than a disable threshold (one per DPM level). If and solely if the final lateral G-force value is not less than the disable threshold (one per DPM level), then the step 128 is repeated. If and solely if the final lateral G-force value is less than the disable threshold (one per DPM level), then the method 100 continues to step 130. At step 130, the TCM 18 disables the predetermined transmission operating level in response to determining that the final lateral G-force is less than the disable threshold.

The method 100 also includes a third part 100c, which entails step 132. At step 132, the TCM 18 receives other inputs from, for example the ECM 16. These inputs include, but are not limited to, dynamic acceleration pedal information, brake pedal information, deceleration information, instant lateral G-force, and accumulated lateral G-force. Then, at step 134, the TCM 18 uses these other input as enabling criteria for DPM levels. In other words, at step 134, the TCM 18 analyzes the other inputs (as enabling criteria). If and solely if the other inputs satisfy the enabling criteria, then the method 100 proceeds to step 136. At step 136, the TCM 18 enables a predetermined transmission operating level based on the enabling criteria for each DPM level. There are multiple criteria for each DPM level. If and solely if the other inputs do not satisfy the enabling criteria, then the method 100 proceeds to step 138. At step 138, the TCM 18 determines whether the other inputs do satisfy the disabling criteria. If and solely if the other inputs do not satisfy the disabling criteria, then the step 138 is repeated. If and solely if the other inputs satisfy the disabling criteria, then the method 100 continues to step 140. At step 140, the TCM 18 disables the predetermined transmission operating level based on the other inputs. As mentioned above, there are multiple criteria for each DPM level.

The method 100 also includes a third part 100c, which entails step 142 and step 144. At step 142, the TCM 18 determines the predetermined determined transmission operating level based on the predicted lateral G-force as determined in the second part 100b of the method 100. At step 144, the TCM 18 determines the predetermined determined transmission operating level based other criteria (as a function of the other inputs) as determined in the third part 100c of the method 100. Then, the method 100 proceeds to step 146. At step 146, the TCM 18 combines the predetermined determined transmission operating level based on the predicted lateral G-force and the predetermined determined transmission operating level based other criteria. Then, at step 148, the TCM 18 finds the maximum enabled DPM level based on the predetermined determined transmission operating level based on the predicted lateral G-force and the predetermined determined transmission operating level based other criteria. Next, at step 150, the TCM 18 selects the maximum enabled DPM level (i.e., the DPMSelectedLevel) and controls the transmission 14 based on the maximum enabled DPM level. Then, at step 152, the method 100 ends. By executing the method 100, the vehicle system 10 uses the FCM 20 and/or the map data stored on the map database module 32 (if equipped) to predict the lateral G-force within a driving style detection algorithm (i.e., the DPM algorithm) in the TCM 18. While the predicted lateral G-force is not used to directly control the speed ratio (and operating conditions) of the transmission 14 gear, the predicted lateral G-force is used to "raise awareness" in the DPM algorithm to augment existing signals which will then choose the appropriate speed ratio. In other words, the TCM 18 uses the predicted lateral G-force as input that is considered to control the operating conditions (e.g., speed ratio) of the transmission 14. However, the TCM 18 may alternatively use the predicted lateral G-force to directly control the speed ratio (and operation conditions) of the transmission 14. It is envisioned, however, that the predicted lateral G-force may be used to directly control the speed ratio (and operating conditions) of the transmission 14.

Figure 7:
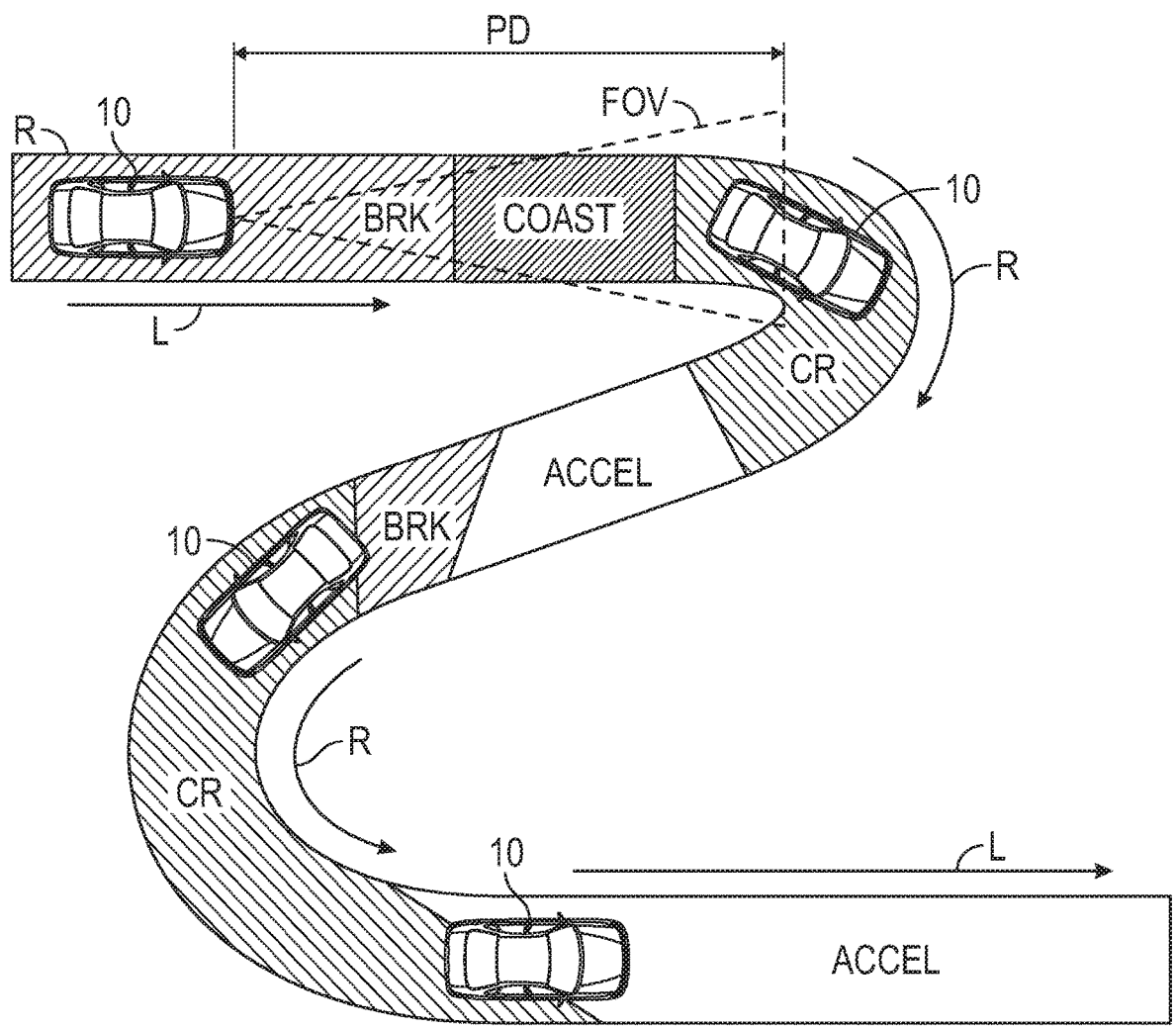
FIG. 7 is a schematic illustration of an example illustrating how the method of FIGS. 4, 5, and 6 would control the transmission of the vehicle.

FIG. 7 is a schematic illustration of an example on how the method 100 would control the transmission 14 of the vehicle system 10. While the vehicle system 10 moves along the road R, the camera 22 of the FCM 20 (FIG. 1) captures images on a field of view FOV. The field of view FOV of the camera (FIG. 1) extends a predetermined, fixed distance PD from the vehicle system 10. In some embodiments, the predetermined, fixed distance PD of the FOV is 40 meters to provide the TCM 18 sufficient time to adjust its operating conditions based on the predicted lateral G-force. In the illustrated example, before the vehicle system 10 reaches the corner region CR, the vehicle system 10 moves in a longitudinal direction L and brakes along a braking region BRK. While the vehicle system 10 travels along the braking region BRK, the TCM 18 triggers downshifts and inhibits upshifts of the transmission 14. To do so, the ECM 16 may increase engine braking to assist the service brakes, the TCM 18 prepares for faster response time to assist vehicle control in mid corner, and the TCM 18 prepares for faster delivery and more axle torque on corner exit. Then, the vehicle system 10 reaches a coast region ("COAST"). While the vehicle system 10 moves along the coast region COAST, the TCM 18 inhibits upshifts of the transmission 14. To do so, the TCM 18 and/or ECM 16 inhibits breaking or acceleration to hold the speed ratio (e.g., gear) of the transmission 14 for a predetermined period of time to wait for driver input. While the vehicle system 10 moves along the braking region BRK or the coasting region COAST, the TCM 18 determines the predicted lateral G-force that the vehicle will experience at a corner region CR based on image data received from the FCM 20. While the vehicle system 10 curves (in the rotational direction R) along the corner region CR, the TCM 18 inhibits upshifts of the transmission 14 and limits downshifts of transmission 14 based, at least in part, on the predicted lateral G-force. To do so, the ECM 16 provides consistent engine braking or acceleration to optimize vehicle balance. Also, the TCM 18 maintains a lower speed ratio (e.g., gear) from the start of the corner to the end of the corner to minimize response time during corner exit. After corner exit, the vehicle system 10 moves along an acceleration region ACCEL. While the vehicle system 10 travels along the acceleration region ACCEL, the TCM 18 employs a time-based upshift sequence of the transmission 14. To do so, the TCM 18 holds a speed ratio (e.g., gear) for a predetermined amount of time because another braking or cornering event may occur in the future. The TCM 18 also monitors the accelerator pedal 15 (FIG. 1) to prevent upshifting of the transmission 14 if an increasing request for axle torque or a rapid decrease for axle torque is detected. The vehicle system 10 also employs the same method 100 when traveling through other braking regions BRK, corning regions CR, and acceleration regions While the best modes for carrying out the disclosure have been described in detail, those familiar with the art to which this disclosure relates will recognize various alternative designs and embodiments for practicing the disclosure within the scope of the appended claims.

What is claimed is:

1. A method for controlling a transmission of a vehicle, comprising:
   determining, via an electronic controller of the vehicle, a predicted lateral G-force that will act on the vehicle while the vehicle moves along a road curve using image data from a front camera of the vehicle before the vehicle moves along the road curve;
   communicating, via the electronic controller of the vehicle, the predicted lateral G-force to a transmission controller; and
   controlling, via the transmission controller, the transmission of the vehicle based on the predicted lateral G-force.

2. The method of claim 1, further comprising receiving the image data from the front camera of the vehicle before the vehicle moves along the road curve.

3. The method of claim 2, wherein determining, via the electronic controller, the predicted lateral G-force includes:
   determining an amount of time the vehicle will take to reach the road curve from a current location as a function of a current vehicle speed of the vehicle and a predicted distance from the current location of the vehicle to the road curve; and
   determining a predicted vehicle speed of the vehicle at the road curve as a function of the current vehicle speed and an acceleration of the vehicle.

4. The method of claim 3, wherein the predicted lateral G-force is a function of a road curvature and the predicted vehicle speed at the road curve.

5. The method of claim 4, further comprising equating the predicted lateral G-force with a current, actual lateral G-force measured by an inertial measuring unit of the vehicle in response to determining that the predicted lateral G-force is less than the current, actual lateral G-force.

6. The method of claim 5, further comprising taking an absolute value of the predicted lateral G-force and filtering the absolute value of the predicted lateral G-force to determine a final lateral G-force value.

7. The method of claim 6, further comprising enabling a predetermined transmission operating level in response to determining that the final lateral G-force value is greater than an enable threshold.

8. The method of claim 6, further comprising disabling a predetermined transmission operating level in response to determining that the final lateral G-force value is less than a disable threshold.

9. The method of claim 7, further comprising selecting a speed ratio of the transmission based on the predetermined transmission operating level.

10. The method of claim 1, wherein the predictive lateral G-force is determined based on the image data from the front camera and map data stored on a map database module of the vehicle.

11. A vehicle system, comprising:
    a transmission;
    a front camera module including a camera processor, a camera in electronic communication with the camera processor, and a camera in electronic communication with the camera processor, wherein the camera processor is programmed to determine a road curvature of a road curve using image data from the camera before the vehicle system moves along the road curve;
    an electronic control module in electronic communication with the front camera module wherein the transmission control module is programmed to:
      receive image data from the front camera of the vehicle system before the vehicle moves along the road curve;
      determine an amount of time the vehicle system will take to reach the road curve from a current location as a function of a current vehicle speed of the vehicle system and a predicted distance from the current location of the vehicle to the road curve;
      determine a predicted vehicle speed of the vehicle system at the road curve as a function of the current vehicle speed and a current vehicle acceleration of the vehicle system; and
      determine a predicted lateral G-force that will act on the vehicle system while the vehicle system moves along the road curve using the road curvature of the road curve;
    a transmission control module in electronic communication with the front camera module and the electronic control module, wherein the electronic control module is programmed to communicate the predicted lateral G-force to the transmission control module, and the transmission control module is programmed to control an operation of the transmission based on the predicted lateral G-force.

12. The vehicle system of claim 11, wherein the predicted lateral G-force is expressed as:

$$PLG = k \cdot V_p^2$$

where:
PLG is the predicted lateral G-force that will act on the vehicle system while the vehicle system moves along the road curve of the road;
k is the road curvature of the road curve; and
$V_p$ is the predicted vehicle speed of the vehicle system at the road curve.

13. The vehicle system of claim 11, further comprising an inertial measurement unit in electronic communication with the front camera module and the electronic control module, wherein the inertial measurement unit is configured to measure a current, actual lateral G-force acting on the vehicle system.

14. The vehicle system of claim 12, wherein the electronic control module is programmed to determine that the predicted lateral G-force is greater than the current, actual lateral G-force.

15. The vehicle system of claim 13, wherein the transmission control module is programmed to equate the predicted lateral G-force with the current, actual lateral G-force measured by the inertial measuring unit of the vehicle in response to determining that the predicted lateral G-force is greater than the current, actual lateral G-force.

16. The vehicle system of claim 11, further comprising an active controller in electronic communication with the front camera module.

17. The vehicle system of claim 16, further comprising a map database module in electronic communication with the active controller, wherein the electronic control module is in electronic communication with the active controller, and the predictive lateral G-force is determined based on the image data from the front camera and map data stored on the map database module of the vehicle system.

18. The vehicle system of claim 11, wherein the electronic control module is programmed to divide the current vehicle speed of the vehicle system by the predicted distance from the current location to the road curve to determine the amount of time the vehicle system will take to reach the road curve from the current location.

19. The vehicle system of claim 11, wherein the electronic control module is programmed to take an absolute value of the predicted lateral G-force and filtering the absolute value of the predicted lateral G-force to determine a final lateral G-force value.

20. The vehicle system of claim 19, wherein the transmission control module is programmed to enable a predetermined transmission operating level in response to determining that the final lateral G-force value is greater than an enable threshold, and the transmission control module is programmed to select a speed ratio of the transmission based on the predetermined transmission operating level, and the predicted vehicle speed at the road curve is expressed as:

$$V_p = V_c + A \cdot T$$

where:

$V_p$ is the predicted vehicle speed of the vehicle system at the road curve;

A is the current vehicle acceleration of the vehicle system;

T is the amount of time the vehicle will take to reach the road curve from the current location of the vehicle system; and $V_c$ is the current vehicle speed.

* * * * *